(12) United States Patent
Goeller

(10) Patent No.: US 9,474,344 B2
(45) Date of Patent: Oct. 25, 2016

(54) SWIVEL MECHANISM FOR TURNING OVER A CASE

(75) Inventor: Eric Goeller, Colombier (CH)

(73) Assignee: Montres Breguet S.A., L'Abbaye (CH)

( * ) Notice: Subject to any disclaimer, the term of this patent is extended or adjusted under 35 U.S.C. 154(b) by 699 days.

(21) Appl. No.: 13/823,282

(22) PCT Filed: Jan. 31, 2012

(86) PCT No.: PCT/EP2012/051506
§ 371 (c)(1),
(2), (4) Date: Mar. 14, 2013

(87) PCT Pub. No.: WO2012/107320
PCT Pub. Date: Aug. 16, 2012

(65) Prior Publication Data
US 2013/0167585 A1 Jul. 4, 2013

(30) Foreign Application Priority Data

Feb. 11, 2011 (EP) ...................................... 11154143

(51) Int. Cl.
*A44C 5/14* (2006.01)
*G04B 37/04* (2006.01)
*F16C 11/04* (2006.01)

(52) U.S. Cl.
CPC ................. *A44C 5/14* (2013.01); *F16C 11/04* (2013.01); *G04B 37/0427* (2013.01); *Y10T 403/32237* (2015.01)

(58) Field of Classification Search
CPC ................. Y10T 403/32213; G04B 37/0008; G04B 37/0025; G04B 37/0041; G04B 37/0427; G04B 37/0472; G04B 37/1426; A44C 5/14; A44C 5/142; A44C 5/145; A44C 5/147; A44C 5/16
See application file for complete search history.

(56) References Cited

U.S. PATENT DOCUMENTS

| | | | | |
|---|---|---|---|---|
| 5,401,067 A | * | 3/1995 | Kurosaki | E05C 5/00 292/63 |
| 7,393,026 B2 | * | 7/2008 | Ikeda | H01R 13/627 292/341.15 |
| 7,507,017 B2 | * | 3/2009 | Chevalier | A44C 5/14 368/281 |

(Continued)

FOREIGN PATENT DOCUMENTS

| | | |
|---|---|---|
| CH | 700 958 | 11/2010 |
| EP | 1 902 641 | 3/2008 |

OTHER PUBLICATIONS

International Search Report Issued Mar. 19, 2012 in PCT/EP12/51506 Filed Jan. 31, 2012.

*Primary Examiner* — Daniel P Stodola
*Assistant Examiner* — Jonathan Masinick
(74) *Attorney, Agent, or Firm* — Oblon, McClelland, Maier & Neustadt, L.L.P.

(57) ABSTRACT

A mechanism for turning over a case between two rest positions relative to a support structure includes a guide element secured to said case or to a pod receiving said case, and a complementary guide element, which cooperates with said guide element via complementary guide surfaces allowing said guide element to make a movement of translation and/or to pivot with respect to said complementary guide element under the effect of the relative movement of a cam respectively comprised in said guide element or complementary guide element, relative to a finger respectively comprised in said complementary guide element or said guide element.

20 Claims, 7 Drawing Sheets

(56) References Cited

U.S. PATENT DOCUMENTS

| | | | | |
|---|---|---|---|---|
| 2006/0018202 A1* | 1/2006 | Girardin | ............ | A44C 15/0025 368/281 |
| 2006/0034161 A1* | 2/2006 | Muller | ................... | G04G 17/08 368/281 |
| 2006/0126445 A1* | 6/2006 | Bouille | .................... | A44C 5/14 368/281 |
| 2008/0068933 A1 | 3/2008 | Chevalier et al. | | |
| 2009/0257323 A1* | 10/2009 | Soltani | ............... | G04B 37/0427 368/281 |
| 2010/0302913 A1* | 12/2010 | Loiseau | ............. | G04B 37/0427 368/281 |

\* cited by examiner

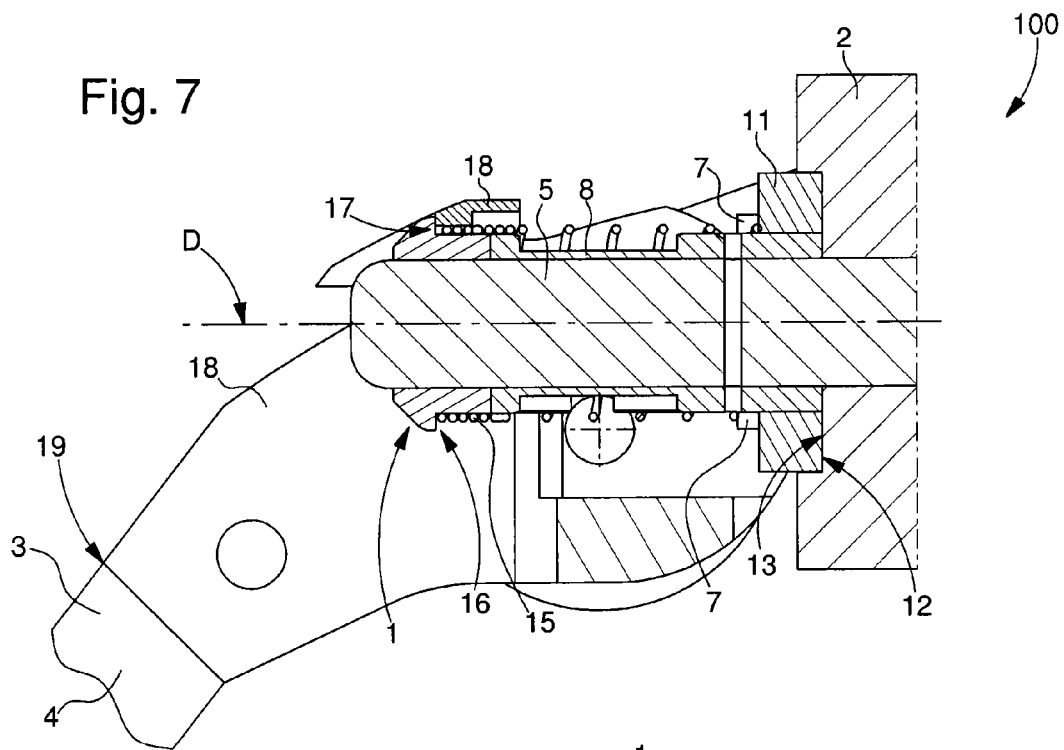
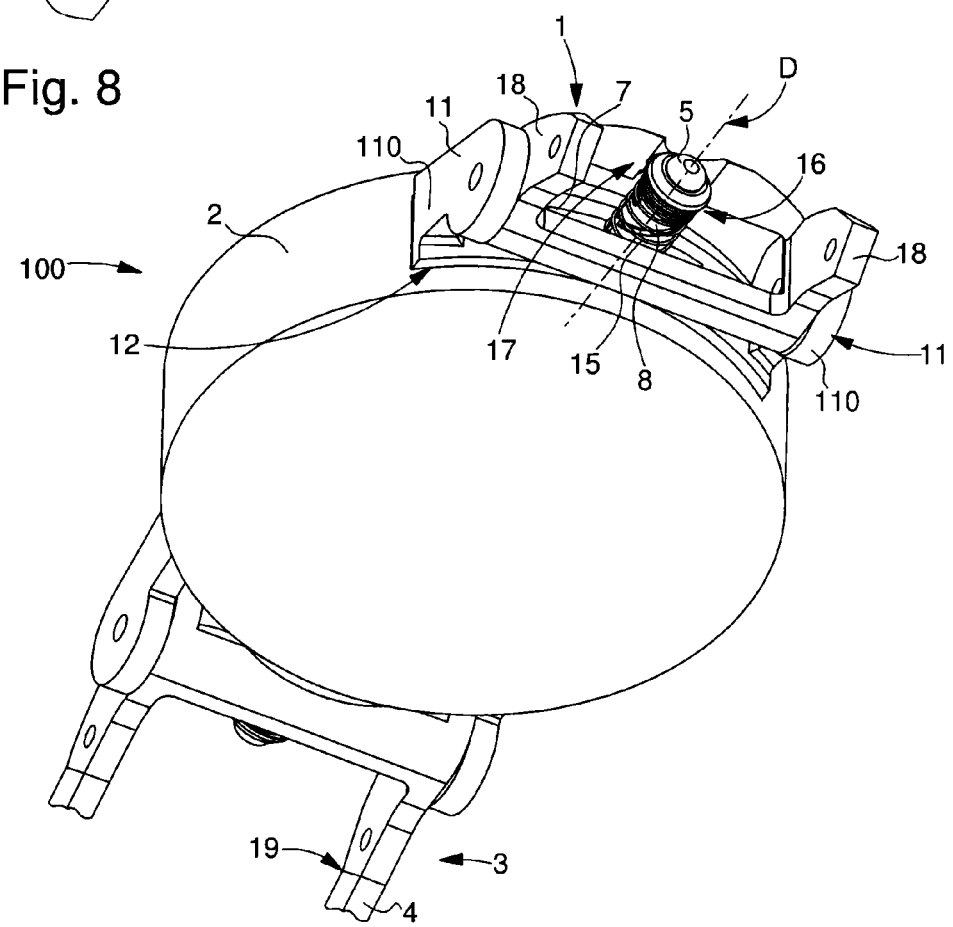

SWIVEL MECHANISM FOR TURNING OVER A CASE

FIELD OF THE INVENTION

The invention concerns a swivel mechanism for turning over a case, about a pivot axis, between at least two rest positions, with respect to a support structure.

The invention also concerns a support structure for a timepiece or piece of jewelry, including at least one clevis to which this turning-over mechanism is secured.

The invention also concerns a timepiece or piece of jewelry including at least one case pivoting about a pivot axis, between at least two rest positions, and including at least one such turning-over mechanism.

The invention concerns the field of personal accessories, and more specifically the fields of jewelry and horology.

BACKGROUND OF THE INVENTION

In the field of horology, or jewelry, it is known to make transforming bracelets, in particular by sliding or flipping over a watch case comprising different displays on each face thereof, or a jewel with a different appearance on different faces, wherein one of the faces may provide protection for the timepiece or jewel during particular activities, such as during travel or during sport or other activities.

FR Patent No 2 633 496 in the name of Fendler discloses a mechanism with semi-covers sliding in slide bars, wherein the aperture revealing a display is achieved by springs released under the action of a pusher.

EP Patent Application No. 1 902 641 A1 in the name of MONTRES BREGUET SA discloses a reversible wristwatch case including a pivoting frame. There are positions in which the watch cannot turn over and other positions where it can be turned over, between different indexing positions. A particular spring arrangement both enables the case to be released and securely locked in position once the indexing position has been reached. It is the user who operates the watch in order to flip it over, since there is no drive element. None of the components of this mechanism ensure movement away from or closer to the indexed positions.

SUMMARY OF THE INVENTION

The invention proposes to overcome the drawbacks of the prior art, by proposing a mechanism that the user can actuate in a simple and secure manner, without removing the object from his wrist and with minimum handling of the case.

The invention therefore concerns a swivel mechanism for turning over a case about a pivot axis, between at least two rest positions, with respect to a support structure, characterized in that said mechanism includes at least one guide element arranged to be secured to said case or to a pod arranged for receiving said case, and in that the mechanism includes a complementary guide element, which is arranged to be secured to said support structure and to cooperate with said guide element via complementary guide surfaces allowing said guide element to make a movement of translation along said pivot axis and/or to pivot about said pivot axis with respect to said complementary guide element under the effect of the relative movement of a cam respectively comprised in said guide element or complementary guide element, relative to a finger respectively comprised in said complementary guide element or said guide element.

According to a feature of the invention, this turning-over mechanism includes at least one cradle, which is fixed to said complementary guide element and includes at least one receiving surface arranged to cooperate in a complementary manner, in at least one of said rest positions of said case, with a bearing surface comprised, as appropriate, in said case or said pod arranged for receiving said case, wherein each said rest position corresponds to an end-of-travel zone of said cam.

According to a feature of the invention, this turning-over mechanism includes a moveable locking means, which is arranged, in a locking position, to cooperate with a stop means comprised in said guide element, to hold said bearing surface in abutment on said receiving surface and, in an unlocking position, to allow said bearing surface to move away from said receiving surface.

According to a feature of the invention, between said guide element and said complementary guide element, this turning-over mechanism includes an elastic return means for creating a relative movement between said case and said complementary guide element and forming a drive means for setting said cam in motion relative to said finger.

The invention also concerns a support structure for a timepiece or piece of jewelry, including at least one clevis to which this turning-over mechanism is secured.

According to a feature of the invention, this support structure forms a bracelet or wristband including two ends for securing at least one case, wherein at least one of said ends comprises a turning-over mechanism of this type.

The invention also concerns a timepiece or piece of jewelry including at least one case pivoting about a pivot axis, between at least two rest positions, and including at least one such turning-over mechanism.

According to a feature of the invention, this timepiece or piece of jewelry comprises a support structure of this type.

BRIEF DESCRIPTION OF THE DRAWINGS

Other features and advantages of the invention will appear more clearly upon reading the following detailed description, with reference to the annexed drawings, in which:

FIG. 7 shows a schematic, partial, longitudinal view of the timepiece of FIG. 1 in the position of FIG. 1 and in a cross-section along a pivot axis of the case.

FIG. 8 shows a schematic, perspective view of the timepiece of FIG. 1 in the position of FIG. 2, just prior to unlocking.

DETAILED DESCRIPTION OF PREFERRED EMBODIMENTS

Figure 1:
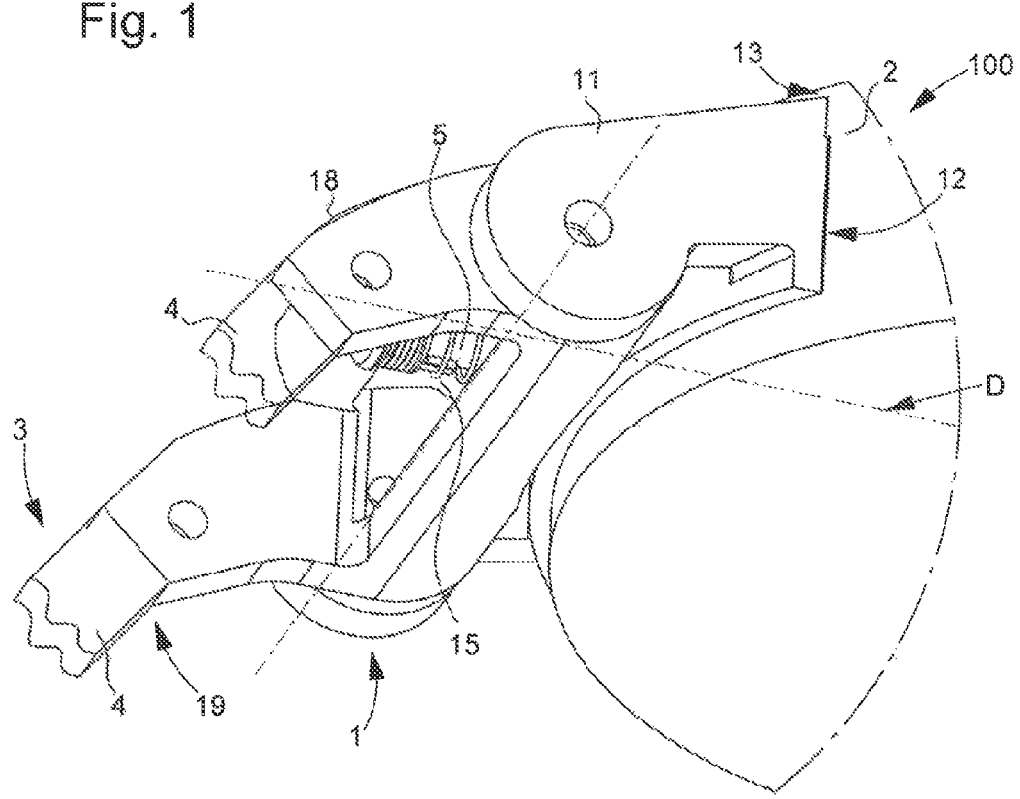
FIG. 1 shows a partial, schematic, perspective view of a timepiece comprising a case, pivotably mounted about a pivot axis relative to a support structure, in this case a bracelet or wristband, via a turning-over mechanism according to the invention, shown in a rest position of the case in abutment on a cradle and wherein the mechanism is in a locked position.
Figure 2:
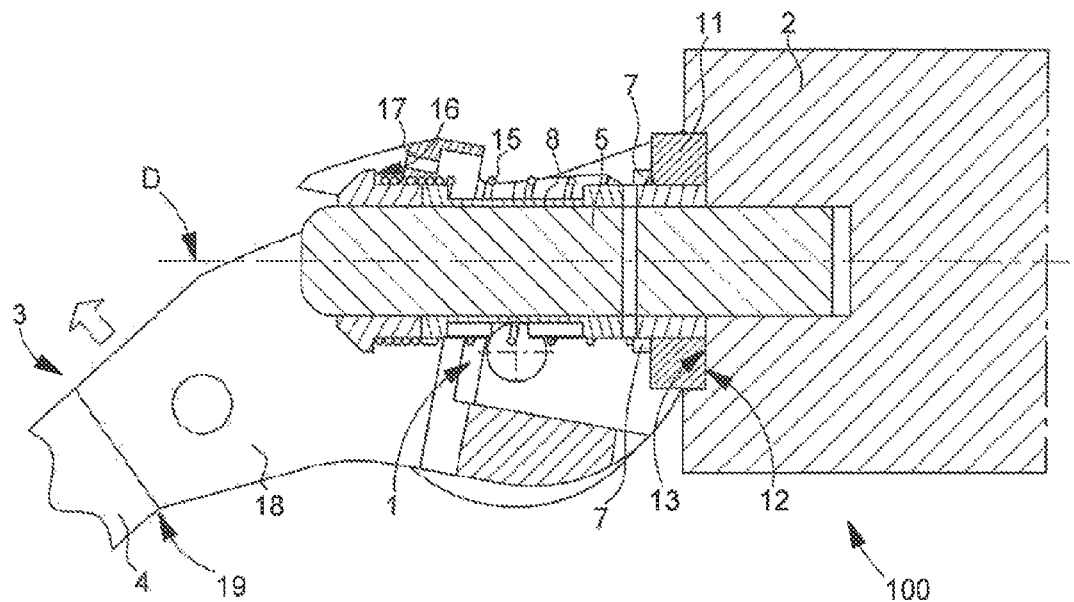
FIG. 2 shows a partial, schematic, longitudinal cross-section along the pivot axis of the case, of the timepiece of FIG. 1, and a detail of the same turning-over mechanism at the start of an unlocking action, wherein the case is still in its initial rest position, abutting on its cradle.
Figure 3:
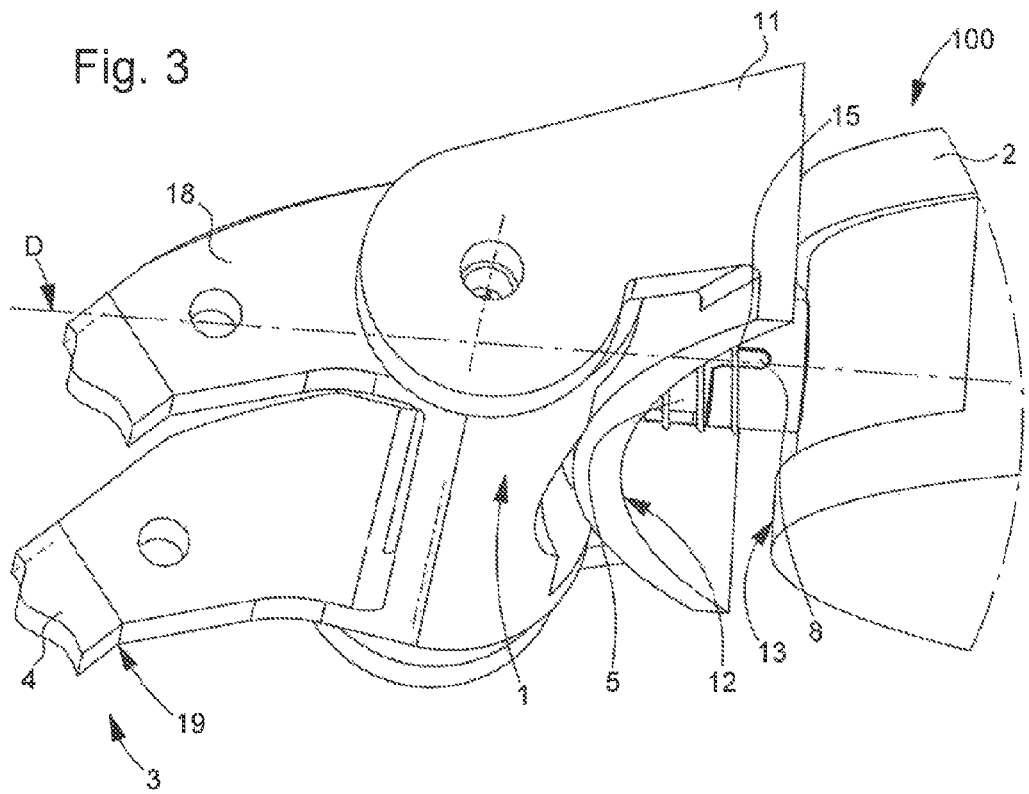
FIG. 3 shows, in a similar manner to FIG. 1, the same timepiece after the case has been turned over 180°, in a position removed from the cradle, and just before it is returned to the cradle in a second rest position similar but opposite to that of FIG. 1.
Figure 4:
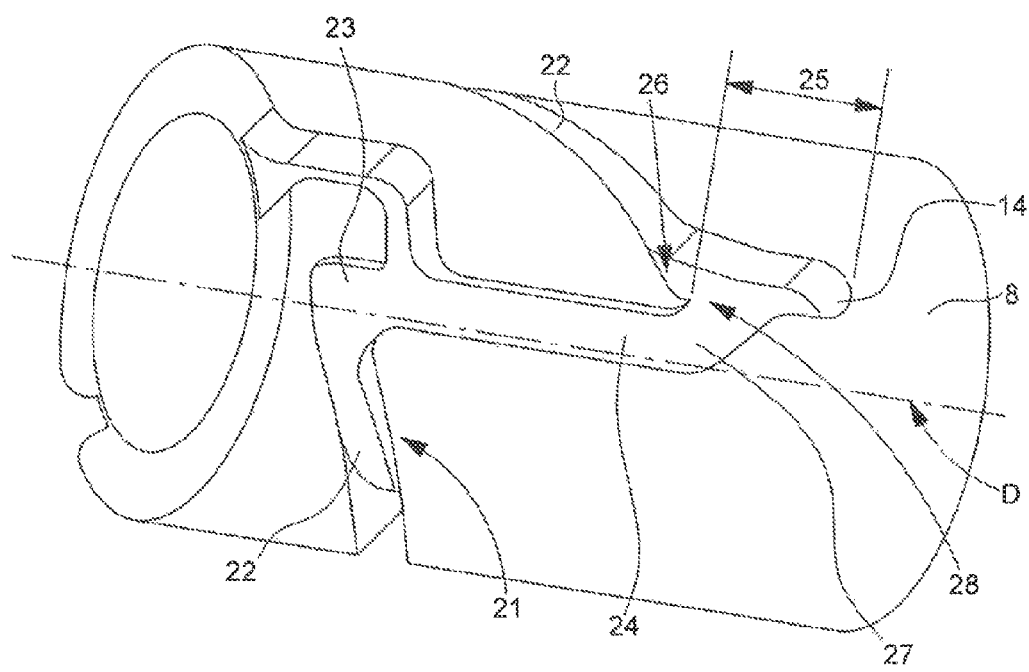
FIG. 4 shows a schematic perspective view of a cam which is comprised in the turning-over mechanism according to the invention and arranged to control the pivoting movements of the case to turn said case over, and movements of translation to allow the case to be released from the cradle before pivoting, and the return thereof to abutment on the cradle after pivoting.
Figure 5:
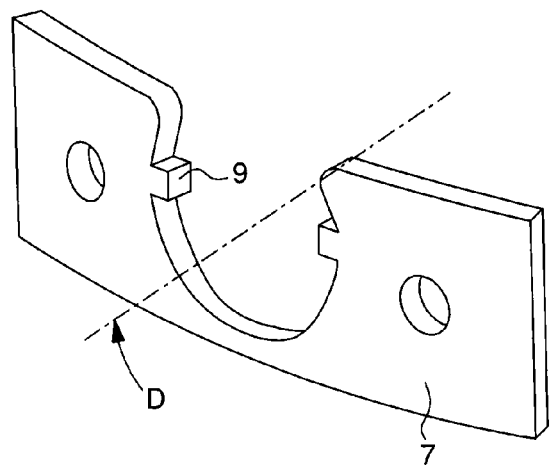
FIG. 5 shows a schematic perspective view of a complementary guide element comprised in the turning-over mechanism according to the invention, for cooperating with the cam and controlling therewith the pivoting and movements of translation of the case.

The invention concerns the field of personal accessories, and more specifically the fields of jewelry and horology.

The invention concerns a swivel mechanism 1 for turning over a case 2 about a pivot axis D between at least two rest positions with respect to a support structure 3. This support structure 3 may be formed by all or part of a bracelet or wristband 4 or a similar element.

This case 2 may consist of a watch, whose different faces it is desired to show on demand, or a piece of jewelry or suchlike. It may also include everyday objects such as a mobile telephone, fire alarm unit, frequency meter, measuring apparatus or other device. The case 2 has at least two visible faces. Although, generally, this type of object is double sided, the invention also applies to a case with a plurality of faces to be presented, as desired or required at any time. The invention is more specifically described here for the preferred application of turning over case 2 through 180°, and those skilled in the art will have no difficulty in extrapolating the features described for a different number of facets and consequently angles.

According to the invention, as seen in the Figures, this mechanism 1 includes at least one guide element 5, particularly an arbor, which is arranged to be added, either directly to the case 2 or to a pod 6, which is arranged to receive case 2, as shown in FIG. 14, and which pivots about pivot axis D.

Mechanism 1 further includes a complementary guide element 7, arranged to be secured to support structure 3, or to an extension of said support structure 3, such as an end link of a bracelet or clevis. This complementary guide element 7 is arranged to cooperate with guide element 5, particularly an arbor, via complementary guide surfaces, respectively comprised in guide element or arbor 5, and complementary guide element 7, which allow guide element or arbor 5 to move in translation along pivot axis D and/or to pivot about said pivot axis D, relative to complementary guide element 7.

The movements of translation and/or pivoting of guide element 5 relative to complementary guide element 7, are performed under the effect of the relative movement of a cam 8 respectively comprised in guide element 5 or complementary guide element 7, relative to a finger 9 respectively comprised in complementary guide element 7 or guide element 5. The guide surfaces, cam 8 and finger 9 are arranged to convert a relative movement of guide element 5 with respect to complementary guide element 7 longitudinally along pivot axis D, into a relative pivoting movement of one or the other relative to pivot axis D.

The Figures illustrate the case where guide element 5 is an arbor which has the shape of a trunnion secured to a case 2 and which includes cam 8, which will be described below. In the Figures, complementary guide element 7 is a plate acting as a rotational fork and including at least one finger 9. In the version illustrated in the Figures, complementary guide element 7 has two fingers 9 facing each other at 180° relative to pivot axis D, and cam 8 includes two raceways facing each other at 180° and each cooperating with one of said fingers 9.

Naturally, the invention may adopt the reverse configuration, not illustrated in the Figures, wherein complementary guide element 7 is formed by an arbor and guide element 5 is formed by a bearing or suchlike.

Preferably, as seen in the Figures, turning-over mechanism 1 includes at least one cradle 11 secured to complementary guide element 7. This cradle 11 includes at least one receiving surface 12, which is arranged to cooperate in a complementary manner, in at least one of the rest positions of case 2, with a bearing surface 13 comprised, as appropriate, in case 2 or pod 6 arranged to receive case 2. Each rest position corresponds to an end-of-travel zone 14 of cam 8. It is clear that cradle 11 and complementary guide element 7 may also form a single-piece unit. The invention is illustrated here for the case in which cradle 11 exists and includes horns 110. It is therefore easy to add a complementary guide element 7, comprising finger(s) 9 to this cradle 11 without having to machine cradle 11 again. Moreover, it is easier to machine complementary guide element 7, which may consist simply of a shaped metal sheet, than a solid element where internal machining is difficult and expensive.

The relative mobility of guide element or arbor 5 with respect to the complementary guide element allows bearing surface 13 to be moved away from or closer to receiving surface 12 along the direction of pivot axis D.

It is clear that the choice of profile of cam 8 determines the turning-over kinematics. With the preferred choice of a helical cam raceway, case 2 can be flipped over in a regular and secure manner, while having a relatively small travel in the direction of pivot axis D, which is preferably chosen to be radial relative to case 2 when the latter has an axis of revolution.

Given the high value that case 2 may have if it is formed of timepiece movements and/or jewels, the pivoting operation must only be able to occur when the user makes a deliberate action, and the mechanism must remain locked between two turning-over operations. Therefore, turning-over mechanism 1 advantageously includes a moveable locking means 17.

This moveable locking means 17 is arranged, in a locking position, to cooperate with a stop means 16 comprised in guide element or arbor 5, to hold the bearing surface 13 in abutment on receiving surface 12 and, in an unlocking position, to allow bearing surface 13 to move away from receiving surface 12.

In order to safeguard case 2, the invention ensures that the user has a few operations to perform in contact with the case as possible.

Therefore, according to the invention, turning-over mechanism 1 includes, between guide element 5, particularly an arbor, and complementary guide element 7, an elastic return means 15, for example in the form of a spring, to create a relative movement between the case and said guide element. The spring 15 shown in the Figures takes the form of a helical spring but could be replaced by a strip spring.

Depending upon the embodiment of the invention, this elastic return means 15 may be devised either to move case 2 away from or closer to complementary guide element 7. It forms drive means for setting cam 8 in motion with respect to finger 9 and thus causes case 2 to pivot.

Figure 6:
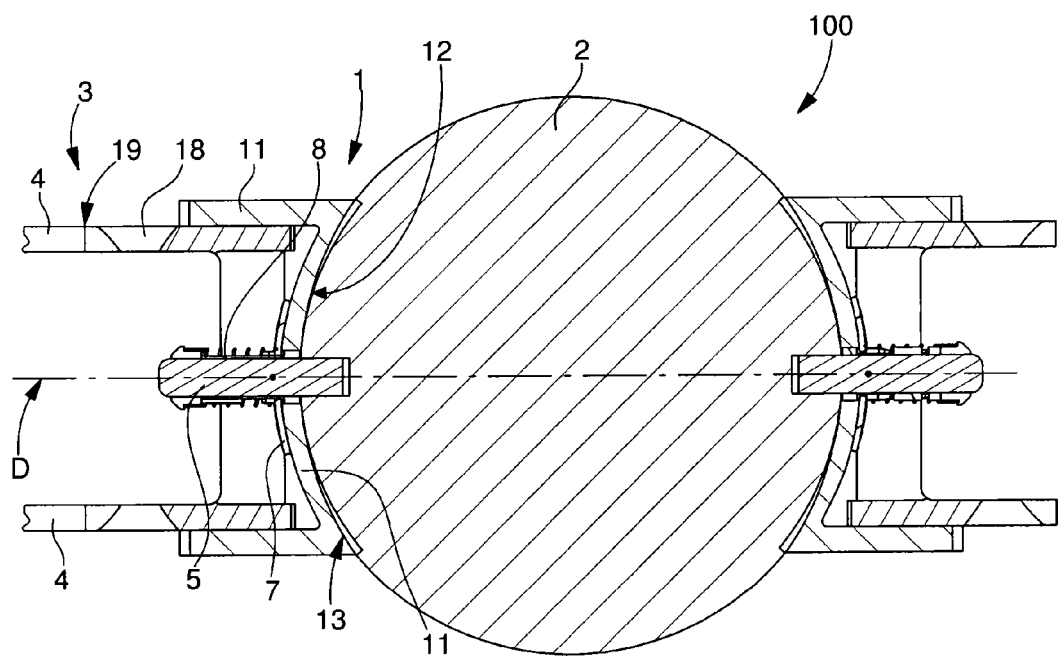
FIG. 6 shows a schematic, partial, bottom view of the timepiece of FIG. 1 in a cross-section passing through the pivot axis, where the timepiece in the same position as in FIG. 1.
Figure 9:
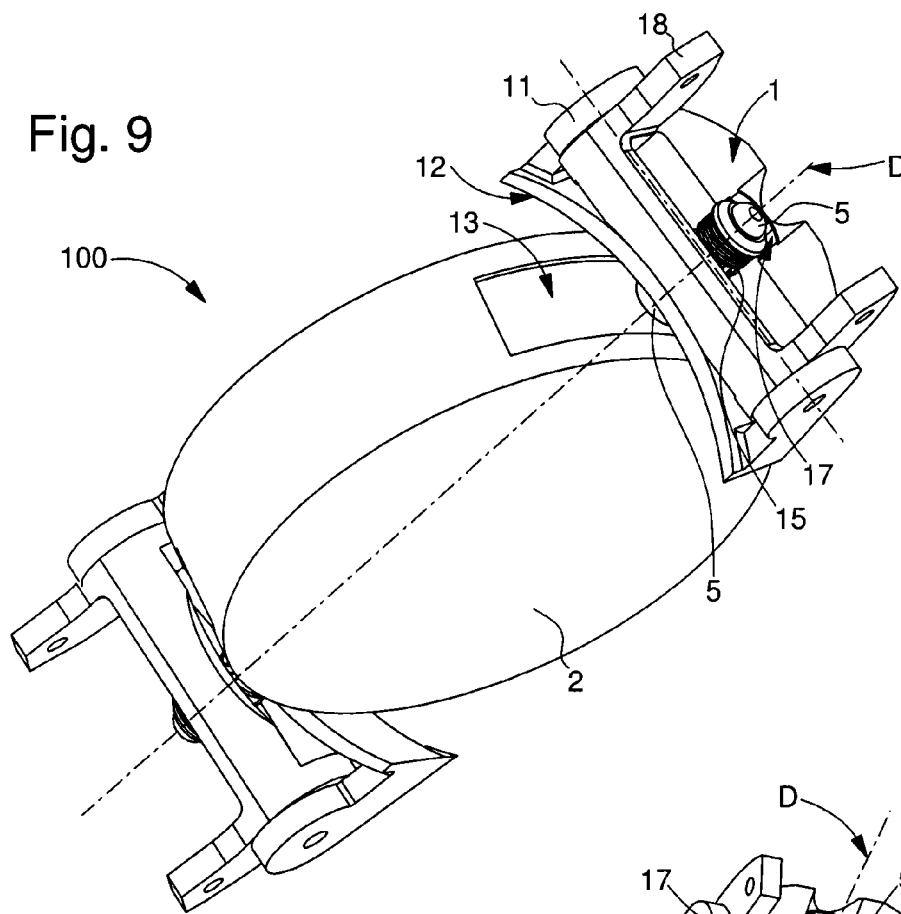
FIG. 9 shows, in a similar manner to FIG. 8, the timepiece of FIG. 1, after unlocking and once the case has started to pivot relative to the cradle.
Figure 10:
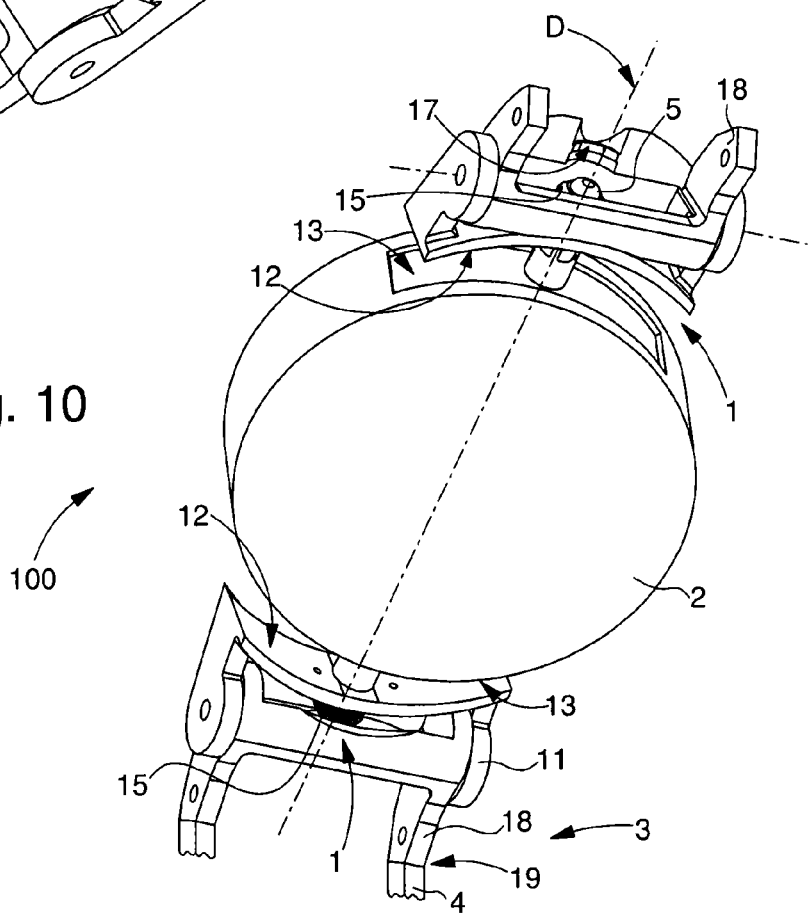
FIG. 10 shows a similar view to FIGS. 8 and 9 of the timepiece of FIG. 1, substantially at the end of the pivoting travel.
Figure 11:
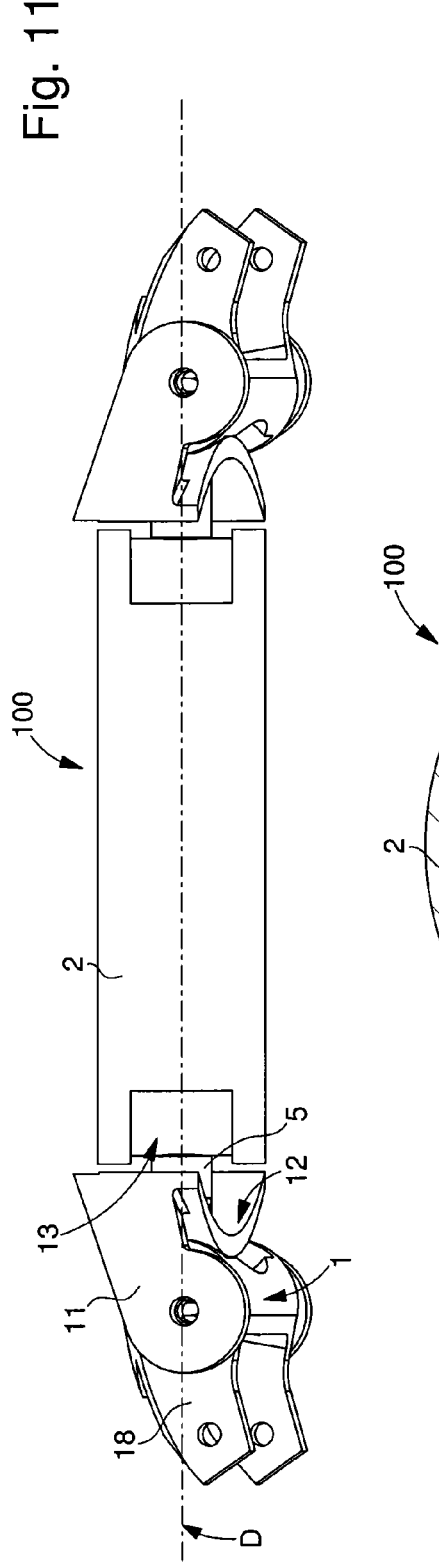
FIG. 11 shows a schematic, partial, perspective view from the side of the case, of the timepiece of FIG. 1 in the same position as in FIG. 10.

In a particular embodiment of the invention shown in the Figures, the turning over kinematics of case 2 occurs in two phases: a manual action by the user, by pulling the bracelet strands away from each other, causes case 2 to pivot through a first angle, for example approximately a quarter of a turn, from a first rest position shown in FIG. 6 to the position shown in FIG. 9. Then the return action of elastic return means 15 causes pivoting through a second angle, for example approximately a second quarter of a turn, to a second rest position, which is opposite to the first. Naturally, these angles are merely illustrative. The kinematics can be chosen without restriction, provided that the following sequence is observed: an unlocking travel, then a pivoting travel of the case, which here is combined with a movement of translation between guide element or arbor 5 and complementary guide element 7, and finally an end-of-travel locking motion.

Naturally, arrangements other than those illustrated by the Figures may be implemented, and may then require a return means that moves case 2 away from rather than closer to complementary guide element 7, depending upon the position thereof and the system configuration, without however departing from the invention.

Advantageously, the moveable locking means 17 also forms a means of winding elastic return means 15.

This moveable locking means 17 may adopt several configurations, for example taking the form of a simple bolt or push button.

Preferably, and as illustrated in the Figures, moveable locking means 17 is integral here with a securing element, particularly a clevis 18, which is moveable and hinged relative to complementary guide element 7 or cradle 11, particularly in abutment on horns 110 thereof. The name "clevis" is used here, although this securing element may take a different shape to the usual U shape of a clevis, which is preferred in the application described here. Preferably, the articulation between cradle 11 or complementary guide element 7 on the one hand, and clevis 18 on the other hand, occurs along an axis of articulation of substantially orthogonal direction to that of pivot axis D.

This clevis 18 is arranged to be secured by support structure 3, or is formed by one end 19 of support structure 3. It may, in particular, form the end of one branch of a bracelet or wristband 4, or a link of said bracelet 4, or be secured to said end.

To return to the geometry of cam 8, this of course depends on the desired kinematics to be given to the motion of case 2. In the preferred embodiment example illustrated in the Figures, cam 8 includes as many end-of-travel zones 14 as there are rest positions of case 2, i.e. two in the case illustrated by the Figures. Between two consecutive end-of-travel zones 14A; 14B, cam 8 has a cam profile 21 comprising, in sequence, in the unidirectional direction of travel of finger 9 on cam 8:

from a first end-of-travel zone 14A,
a first release travel 25 substantially parallel to pivot axis D,
the start of a ramp 26,
a substantially helical ramp 22 around pivot axis D,
an end of a ramp 23 the farthest from the first end-of-travel zone 14A forming a turning back point towards
a return path 24 substantially parallel to pivot axis D ending,
in proximity to a second end-of-travel zone 14B, by a change of direction zone 27,
then by a connecting path 28 to the second end-of-travel zone 14B.

In a preferred application, the turning-over mechanism 1 includes, symmetrically along pivot axis D and on both sides of case 2 or pod 6 arranged for receiving case 2, two arbors 5 each arranged to be added to case 2 or to a pod 6 arranged for receiving case 2. Mechanism 1 further includes a complementary guide element 7, arranged to be secured to the support structure 3, for each guide element or arbor 5. This complementary guide element 7 is arranged to cooperate with guide element 5 via complementary guide surfaces allowing guide element 5 to make a movement of translation along pivot axis D, and/or to pivot about pivot axis D, relative to complementary guide element 7 under the effect of the relative movement of a cam 8 respectively comprised in guide element 5, or complementary guide element 7, relative to a finger 9 respectively comprised in complementary guide element 7 or guide element 5. Thus case 2 is suspended perfectly.

The invention further concerns a support structure 3 for a timepiece or piece of jewelry 100, this structure 3 comprising at least one clevis 18 to which a turning-over mechanism 1 is secured. In particular, this support structure 3 forms a bracelet 4 comprising two ends for securing at least one case 2, wherein at least one of the ends includes a turning-over mechanism 1.

Figure 12:
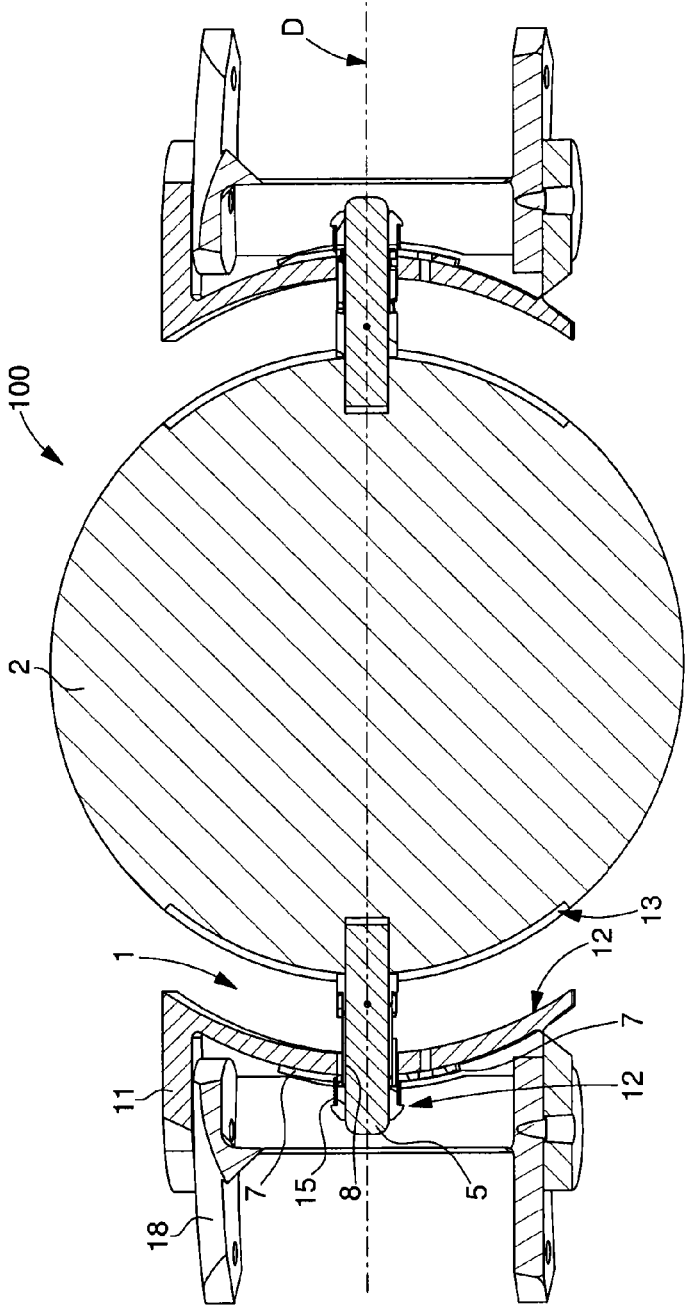
FIG. 12 shows a schematic, partial, bottom view of the timepiece of FIG. 1 in a cross-section passing through the pivot axis, where the timepiece is in the same position as in FIG. 10.
Figure 13:
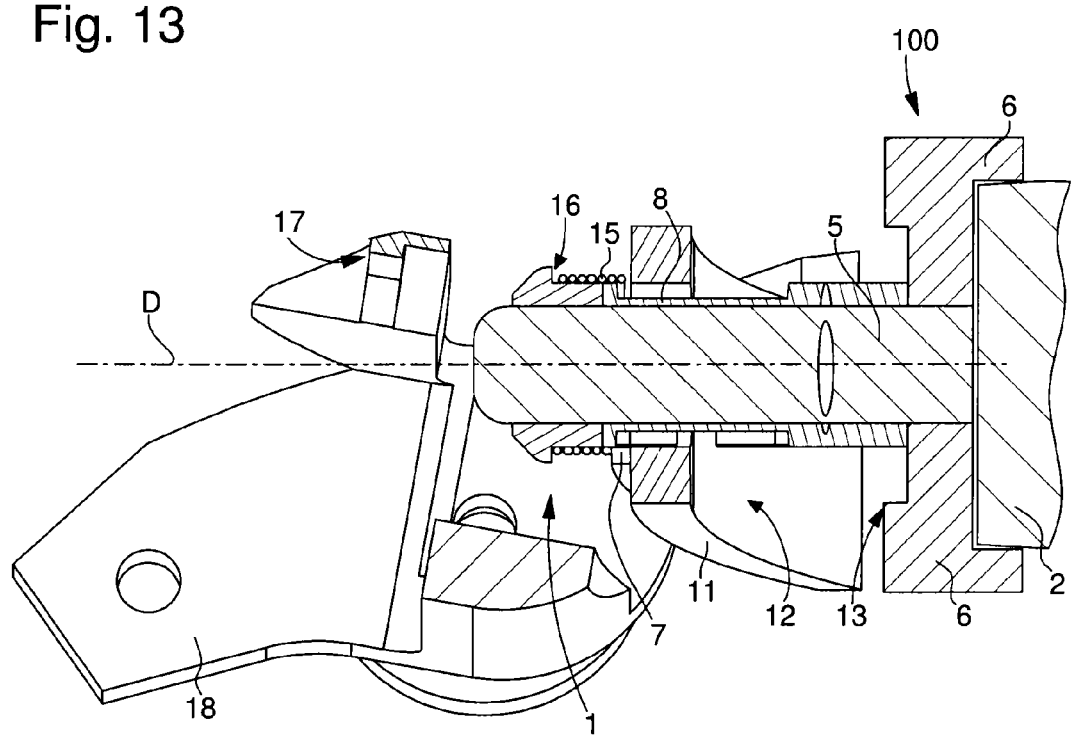
FIG. 13 shows a schematic, partial elevation of the timepiece of FIG. 1, in a cross-section passing through the pivot axis, where the timepiece is in the same position as in FIG. 10.

Also preferably, support structure 3 forms a bracelet 4 comprising two ends for securing at least one case 2, each of the ends including a turning-over mechanism 1, as seen in FIGS. 6 and 12. In FIG. 12 the two mechanisms 1 are symmetrical and respectively comprise arbors 5A, 5B, guide elements 7A, 7B, cradles 11A, 11B, cleviss 18A, 18B. The other components have not been numbered in order to simplify the Figure.

Advantageously, support structure 3 includes at least one unfolding buckle, or a mechanism for changing the circumference thereof between an unfolded position, allowing it to be placed on the user's wrist, and a folded position for holding it on the wrist, with a smaller circumference than in the unfolded position. It is thus very easy for the user to start the turning-over movement of the case, which will be described below:

the starting position is one of the rest positions illustrated in FIGS. 1, 6 and 7;
the user, wearing timepiece 100 on his wrist, opens the unfolding buckle if there is one, or at least places support structure 3, or bracelet 4 if appropriate, in an unfolded position which allows case 2 mobility in a perpendicular direction to pivot axis D and to the plane tangential to the user's wrist;

the user allows support structure 3 mobility so as to pull said structure substantially in the direction of pivot axis D;

while pressing slightly on case 2, typically on the crystal if it is a watch, in the perpendicular direction described above;

these movements unlock locking means 17, since when case 2 is pushed in slightly, clevis 18 moves angularly relative to cradle 11 and stop means 16 allows the relative movement of guide element 5 with respect to complementary guide element 7. This relative movement is made possible and is illustrated by successive changes into the states illustrated in FIGS. 8 and 9;

pulling slightly on the opposite strands of the bracelet, on both sides of case 2, then allows guide element 5, and thus case 2, to start pivoting relative to complementary guide element 7;

the elastic return means 15 releases its energy to move case 2 closer to cradle 11 and to perform, without any action by the user, the remainder of the pivoting travel. The path of helical cam ramp 22 ensures the complete pivoting of case 2, through 180° in the example of the Figures.

The finger is then at turning back point 23;

the user then only needs to stop pulling on bracelet 4 or on support structure 3, finger 9 passes through return path 24 in the indexed position, then the change of direction zone, to reach the next end-of-travel zone 14. Stop means 16 is again engaged by locking means 17, which is again wound, and case 2 is then in a second rest position opposite to the initial rest position;

the user then only needs to return support structure 3 to the folded position, simply by closing the unfolding buckle.

In this preferred embodiment, case 2 always pivots in the same direction.

The pivoting of the case is thus performed by mechanism 1 alone, without any manual pivoting aid, and in an entirely secure manner.

In this preferred embodiment, turning-over mechanism 1 is external to the middle part of the timepiece, which avoids any sealing problems. However, naturally, it is possible to envisage moving the invention to the interior of the middle part. It is also possible, in a variant, to provide a pusher, for example on a horn, to control the movement of translation and pivoting of case 2.

Owing to the invention, the case can be turned over without removing the timepiece or piece of jewelry from the wrist.

The invention also concerns a timepiece or piece of jewelry 100 including at least one case 2 pivoting about a pivot axis D between at least two rest positions, and including at least one turning-over mechanism 1.

Preferably, this timepiece or piece of jewelry 100 includes this type of support structure 3.

In a preferred application, illustrated in the Figures, timepiece or piece of jewelry 100 is a wristwatch, and case 2 is a watch case including at least one timepiece movement, and having at least two different faces, each visible in one of the rest positions.

The invention claimed is:

1. A swivel mechanism for turning over a case about a pivot axis, between at least two rest positions, with respect to a support structure, the mechanism comprising:

at least one guide element arranged to be secured to said case or to a pod arranged for receiving said case;

a complementary guide element, which is arranged to cooperate with said at least one guide element via complementary guide surfaces; and a cam respectively comprised in said at least one guide element or complementary guide element, wherein said at least one guide element is configured to move in translation along said pivot axis and to pivot about said pivot axis with respect to said complementary guide element under the effect of the relative movement of the cam relative to a finger respectively comprised in said complementary guide element or said at least one guide element.

2. The swivel mechanism according to claim 1, wherein, secured to said complementary guide element the mechanism includes at least one cradle including at least one receiving surface arranged to cooperate in a complementary manner, in at least one of said rest positions of said case, with a bearing surface comprised in said case or said pod arranged for receiving said case, each said rest position corresponding to an end-of-travel zone of said cam.

3. The swivel mechanism according to claim 2, wherein the mechanism includes a moveable locking means which is arranged to cooperate, in a locking position, with a stop means comprised in said at least one guide element to hold said bearing surface in abutment on said receiving surface and, in an unlocking position, to allow the relative movement of said bearing surface away from said receiving surface.

4. The swivel mechanism according to claim 3, wherein said moveable locking means forms a means of winding an elastic return means.

5. The swivel mechanism according to claim 3, wherein said moveable locking means is integral with a moveable clevis which is hinged relative to said complementary guide element or said cradle.

6. The swivel mechanism according to claim 5, wherein said clevis is arranged to be secured to said support structure, or is formed by one end of said support structure.

7. The swivel mechanism according to claim 1, wherein the mechanism includes, between said at least one guide element and said complementary guide element, an elastic return means for creating a relative movement between said case and said complementary guide element and forming a drive means for setting said cam in motion relative to said finger.

8. The swivel mechanism according to claim 6, wherein the elastic return means tends to move said case closer to said complementary guide element.

9. The swivel mechanism according to claim 6, wherein said elastic return means forms a drive means which ensures the relative movement of said cam with respect to said finger and thus the pivoting of said case.

10. The swivel mechanism according to claim 7, wherein a moveable locking means forms a means of winding said elastic return means.

11. The swivel mechanism according to claim 1, wherein said cam includes as many end-of-travel zones as there are rest positions of said case, and that, between consecutive end-of-travel zones said cam has a cam profile, which includes in sequence, in an unidirectional direction of travel of said finger on said cam, from a first end-of-travel zone a first release travel substantially parallel to said pivot axis, the start of a ramp, a substantially helical ramp around said pivot axis, a ramp end which is the farthest from said first end-of-travel zone and forms the turning point for a return path substantially parallel to said pivot axis ending, in proximity to a second end-of-travel zone in a change of direction zone, then a connecting path towards said second end-of-travel zone.

12. The swivel mechanism according to claim 1, wherein the at least one guide element of the mechanism includes, symmetrically along said pivot axis on both sides of said case or said pod arranged for receiving said case, two said guide elements each arranged to be added to said case or to a pod arranged for receiving said case, and in that the mechanism includes one said complementary guide element, which is arranged to be fixed to said support structure, for each said guide element, and to cooperate with said guide elements via complementary guide surfaces allowing said guide elements to make a movement of translation along said pivot axis and to pivot about said pivot axis relative to said complementary guide elements under the effect of the relative movement of a cam respectively comprised in said guide elements, or said complementary guide elements relative to a finger respectively comprised in said complementary guide elements or said guide elements.

13. The swivel mechanism according to claim 1, wherein the at least one guide element is an arbour.

14. A support structure for a timepiece or piece of jewelry comprising at least one clevis to which is fixed a swivel mechanism according to claim 1.

15. The support structure according to claim 14, wherein the structure includes at least one unfolding buckle or a mechanism arranged to change the circumference thereof between an unfolded position, allowing positioning around a user's wrist and a folded position, allowing said structure to be held around said wrist, with a smaller circumference than in said unfolded position.

16. A timepiece or piece of jewelry comprising at least one case pivoting about a pivot axis between at least two rest positions and comprising at least one swivel mechanism according to claim 1.

17. A timepiece or piece of jewelry comprising at least one case pivoting about a pivot axis between at least two rest positions, wherein the timepiece or piece of jewelry includes a support structure including at least one clevis to which is fixed a swivel mechanism according to claim 1.

18. The timepiece or piece of jewelry according to claim 16 or 17, wherein the timepiece or piece of jewelry is a wristwatch and in that said case is a watch case which includes at least one timepiece movement and includes at least two different faces, each visible in one of said rest positions.

19. A support structure for a timepiece or a piece of jewelry, wherein the structure forms a bracelet comprising two ends for securing at least one case, wherein at least one of said ends comprises at least one clevis to which is fixed the swivel mechanism according to claim 1.

20. A support structure for a timepiece or a piece of jewelry, wherein the structure forms a bracelet comprising two ends for securing at least one case, wherein each of said ends comprises at least one clevis to which is fixed the swivel mechanism according to claim 1.

* * * * *